C. F. KETTERING.
SYSTEM OF ELECTRICAL GENERATION AND CONTROL.
APPLICATION FILED DEC. 16, 1916.
1,337,364. Patented Apr. 20, 1920.
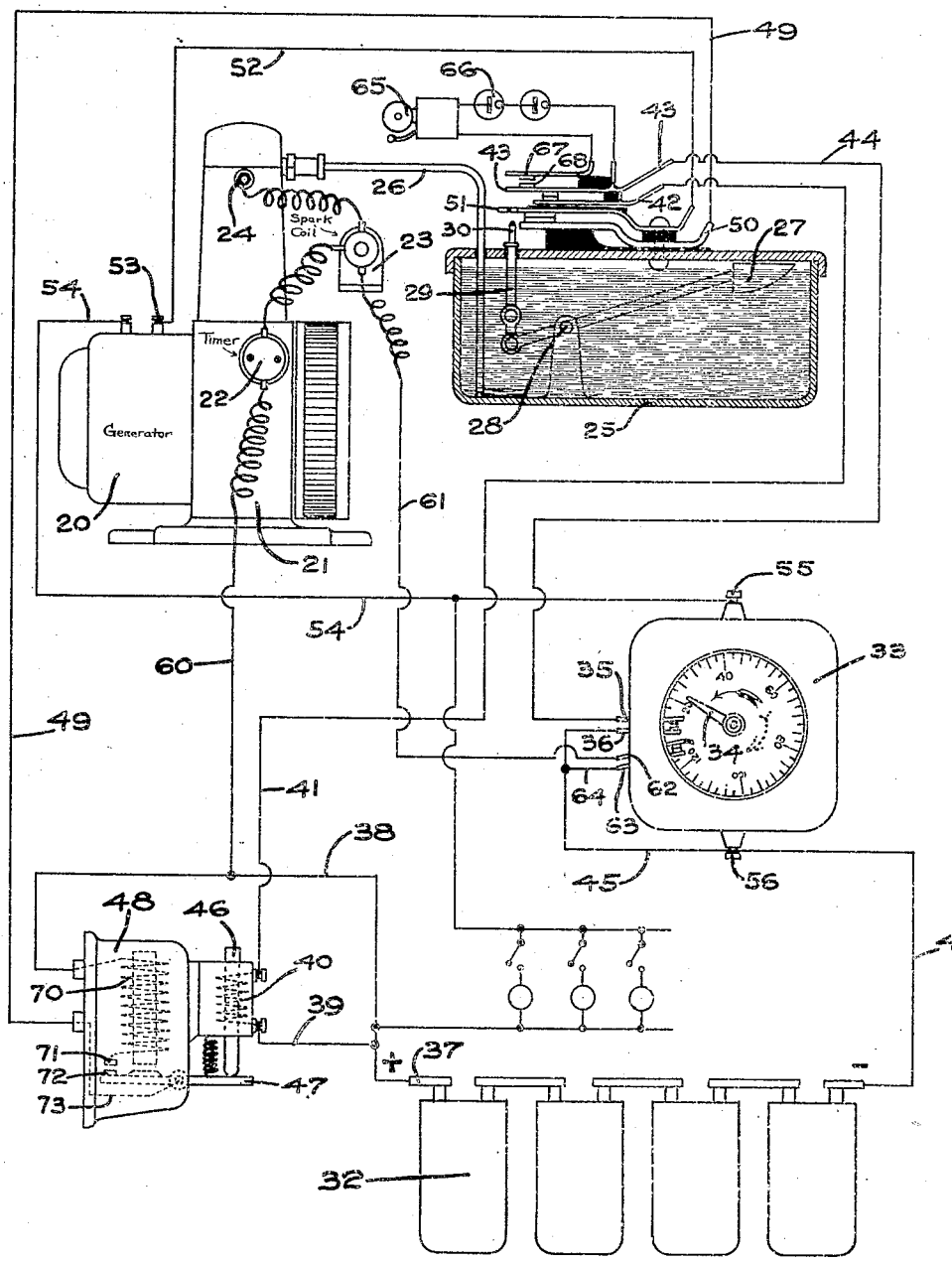

UNITED STATES PATENT OFFICE.

CHARLES F. KETTERING, OF DAYTON, OHIO, ASSIGNOR, BY MESNE ASSIGNMENTS, TO THE DELCO-LIGHT COMPANY, OF DAYTON, OHIO, A CORPORATION OF OHIO.

SYSTEM OF ELECTRICAL GENERATION AND CONTROL.

1,337,364.   Specification of Letters Patent.   Patented Apr. 20, 1920.

Application filed December 16, 1916. Serial No. 137,360.

*To all whom it may concern:*

Be it known that I, CHARLES F. KETTERING, a citizen of the United States of America, residing at Dayton, county of Montgomery, and State of Ohio, have invented certain new and useful Improvements in Systems of Electrical Generation and Control, of which the following is a full, clear, and exact description.

The present invention relates to an improvement in electrical systems, and more particularly to that type wherein the electric machine is driven as a generator by an engine, to furnish current for charging and other purposes, and the engine is cranked by the electric machine operating as a motor for starting purposes.

One of the objects of the present invention is to provide protecting devices which will prevent the operation of the electric machine as a motor when the fuel supply of the engine reaches a predetermined low point, and thereby will prevent the cranking of the engine by the electric machine until the fuel supply is replenished.

Referring to the drawing wherein one preferred form of the present invention is clearly illustrated, the view, partly diagrammatic and partly structural, the numeral 20 designates an electric machine which is so constructed that it can operate as an electric motor or as a generator. This machine is connected to the engine 21, preferably of the combustion or explosion type, which includes an ignition system comprising the timer 22, coil 23, and the spark plug 24.

A fuel tank 25 is also associated with this engine, said tank being connected to the mixing valve of said engine by means of the pipe line 26, which projects within the tank.

A float element 27, fulcrumed on a projection at the point 28, is included within said tank 25, and is provided with an arm 29 which projects through the top of said tank. The arm 29 is provided with a reduced end portion 30, which is so arranged that when the supply of fuel within the tank reaches a predetermined low point, certain electrical connections will be made and broken by the raising of the arm 29 and the consequent engaging of certain contact plates by the reduced end portion 30, for the purposes described hereinafter.

The construction of the engine 21 and the dynamo-electric machine 20, is substantially the same as that disclosed in the co-pending applications of Charles F. Kettering and William A. Chryst, Serial No. 58,207, filed October 27, 1915, and Ernest Dickey, Serial No. 119,888, filed September 13, 1916, and therefore the detailed structure of these units will not be further described in connection with the present application.

The electric machine 20 is electrically connected with the storage battery 32, which receives current from the electric machine when the same is operating as a generator, and which will, under certain conditions, as will be clearly explained hereinafter, discharge current back from the electric machine to operate the same as a motor for starting purposes.

The system as shown in the present application is of the automatic type; that is, the operation of the engine and consequently the operation of the electric machine is effected automatically, in accordance with the condition of charge of the storage battery, and this automatic operation of the electric machine will be continuously carried out except at such times as the fuel level in the tank 25 reaches a predetermined low point.

It will be understood that if the fuel in the tank 25 reaches such a low point that it will not properly feed the fuel to the engine 21, and the charge of the batteries is such that the automatic starting would normally be brought into effect, mechanism is actuated by the float valve contained in the fuel chamber to prevent any discharge from the battery, and thereby prevent any depletion of the battery, due to the operation of the electric machine as a motor and the consequent cranking of the engine. However, if the cranking operation was allowed to continue for any extended length of time, the depletion of the batteries would be effected inasmuch as it would be impossible for the engine to become self-actuating due to the lack of a proper supply of fuel.

The electrical connections and the controlling mechanism for effecting the automatic stopping and starting of the engine, together with the mechanism actuated by the float valve in the fuel tank, will be explained in connection with the operation of the system, which may be described as follows:

Supposing that the batteries have reached a predetermined discharged state, the electrical measuring instrument designated by the numeral 33, which, in the present instance, may be a quantity meter of the ampere-hour-meter type, will be operated to such a position that the hand 34 will engage with the contact plate 35 and force the same in contact with the plate 36. This will close the following circuit:

From the positive terminal 37 of the battery 32, through a conductor 38, branch conductor 39, to the solenoid coil 40, thence through conductor 41, and providing the fuel tank 25 has a sufficient supply of fuel to maintain the contact actuated arm 29 in the position shown in the diagrammatic figure, through the conductor plates 42 and 43, through conductor 44, across the contacts 35 and 36, thence back to the negative side of the battery via the conductor 45. The closing of this circuit will tend to energize the solenoid coil 40 and thereby effect a movement of the solenoid plunger 46 in a downward direction in the figure, so as to actuate the lever 47. This lever 47 will tend to close the following circuit:

From the positive side of the battery 32, through the conductor 38, series winding 70, to the contact 71 and thence through the contact 72 mounted on the lever 47, thence through the connection 73 to the lead 49, across the contact plates 50 and 51, through conductor 52, to the terminal 53 of the dynamo-electric-machine 20. The current will flow through the field and armature connections of the electric machine in substantially the same manner as that described in the aforementioned co-pending applications, and thence through conductor 54, to the terminal 55 of the electrical measuring instrument 33, thence across said instrument to the terminal 56, and back to the battery via the conductor 45. At the same time the following ignition circuit will be closed:

From the conductor 38, through the branch conductor 60, to the timer 22, thence to the coil 23, through conductor 61, across the contacts 62 and 63, which are associated with the electrical measuring instrument 33 in a manner to be described hereinafter to the conductor 45 via the branch wire 64, and thence back to the negative side of the battery.

Now, as soon as the above-mentioned circuits are completed, the electric machine will tend to operate as a motor and will crank the engine 21, and thereby bring the same into self-operation.

As soon as the engine has become self-actuating, it will speed up and will then drive the electric machine 20 as a generator. The output of the generator will tend to oppose the current flowing from the battery 32, and will energize the winding 70 of the controller switch 48 in such a manner as to maintain the lever 47 in attracted position and the contacts 71 and 72 closed. A more detailed description of the switch 48 will be found in the co-pending applications referred to.

Now, as soon as the electric machine tends to charge the storage batteries, the current flowing through the electrical measuring instrument 33, will cause the hand 34 of said instrument to move in the direction of the dotted arrow shown in the drawing of said instrument, until said hand engages with the contact plate 62 and forces the same out of contact making position with the plate 63. This operation will only take place at such times as the battery has reached a predetermined condition; that is, a substantially saturated condition.

The result of opening the contacts 62 and 63 will be to break the ignition circuit, which will of course result in bringing the engine to a stop, and also causing the electric machine to be brought to a stop.

As soon as the electric machine slows down, the voltage through the aforementioned charging circuit will drop below the voltage of the storage batteries 32 and cause the current from the storage batteries to try to flow back through the electric machine and operate the same as a motor. This will be prevented, however, by means of the controller switch 48, which, as has been described in the co-pending applications mentioned heretofore, is provided with a reverse current winding which will tend to open the main circuit through the electric machine and thereby prevent the discharge of the storage batteries.

Supposing, however, that the batteries become discharged and that the supply of fuel in the tank 25 reaches a predetermined low point; that is, reaches such a point that the float 27 will be in such a position that the arm 29 will be raised into engagement with the contact plates 51 and 52, due to the position of the arm 34 of the electrical measuring instrument 33, the contact plates 35 and 36 will be closed, but current will be prevented from flowing from the battery through the solenoid coil 40 and the conductors 41 and 44, by the separation of the contact plates 42 and 43, through the arm 29 controlled by the float element in the fuel tank. This will prevent the operation of the electric machine as a motor to crank the engine, due to the fact that no current is flowing through the solenoid 40, and the controller switch will therefore remain in contact breaking position.

It is, however, possible to manually operate the lever 47, in which case the current would flow from the battery through the necessary circuits to the electric machine and operate it as a motor, when the fuel tank is empty. In order to prevent this, the contacts 50 and 51 are provided, across which the main cranking and charging circuit flows. These contacts are concurrently opened by the arm 29 upon the opening of the contacts 42 and 43, as described heretofore, and will consequently prevent the operation of the electric machine as a motor by the manual operation of the controller switch 48.

Under certain conditions it is advisable to notify the attendant, or operator, of the fact that the supply of fuel in the tank 25 is not sufficient to permit the operation of the engine 21, and a signaling device, shown in the present instance as including a bell 65, is therefore provided which is located in a local circuit including batteries 66 and the contact points 67 and 68. This indicating device or signal 65 will therefore be brought into operation by the closing of the contacts 67 and 68, which is effected by the operation of the arm 29 engaging with the contact plate 43.

As soon as the operator replenishes the tank 25 with a sufficient quantity of fuel, the float 27 will rise to such a position that the arm 29 will be retracted into substantially the position shown in the diagrammatic figure, and thereby permit the contact plates 43 and 51 to assume their normal relative positions, and also to break the electrical circuit through the indicating device to permit the contact points 67 and 68 to separate.

A lighting circuit or any work circuit is shown as being tapped off of the main lines 54 and 38.

While the form of mechanism herein shown and described, constitutes a preferred form of embodiment of the invention it is to be understood that other forms might be adopted all coming within the scope of the claims which follow.

What I claim is as follows:

1. In a device of the character described, the combination with an engine having a fuel supply; of a starting device therefor; and means for entirely preventing the operation of the starting device when the fuel supply reaches a predetermined low point, or for immediately discontinuing the operation of the starting device in case the fuel supply reaches a predetermined low point.

2. In a device of the character described, the combination with an engine having a fuel supply; of a dynamo electric machine adapted to operate as a motor to crank said engine; and means controlled by the fuel supply for entirely preventing the operation of the starting device as a motor, when the fuel supply reaches a predetermined low point, or for immediately discontinuing the operation of the dynamo in case the fuel supply reaches a predetermined low point.

3. In a device of the character described, the combination with an engine having a fuel supply; of a dynamo-electric-machine connected to said engine, and operable as a motor for starting purposes; a storage battery adapted to be electrically connected with said dynamo-electric-machine; and means controlled by the fuel supply, adapted to prevent the flow of current from the battery to the electric machine when the fuel supply reaches a predetermined low point, or for immediately discontinuing the operation of the dynamo in case the fuel supply reaches a predetermined low point.

4. In a device of the character described, the combination with an engine having a fuel supply; of an electric starting device therefor, operable as a motor for starting purposes, and as a generator for charging purposes; a storage battery electricaly connected with said starting device; and means controlled by the fuel supply for breaking the electrical connection between the battery and the starting device when the fuel supply reaches a predetermined low point and thereby entirely preventing the operation of the starting device as a motor for starting purposes, or for immediately discontinuing the operation of the starting device in case the fuel supply reaches a predetermined low point.

5. In a device of the character described, the combination with an engine having a fuel supply; of a storage battery; an electric machine connected to said engine and to said storage battery, and adapted to automatically stop and start the engine in accordance with predetermined conditions of the battery charge; and means controlled by the fuel supply for entirely preventing the operation of the electric machine as a motor to start the engine when the fuel supply reaches a predetermined low point, or for immediately discontinuing the operation of the starting device in case the fuel supply reaches a predetermined low point.

6. In a device of the character described, the combination with an engine having a fuel suply; of a dynamo-electric-machine connected thereto; an electric storage battery electrically connected to the dynamo-electric-machine; means responsive to the condition of charge of said battery, to automatically start and stop said engine; and means controlled by the fuel supply for entirely preventing the operation of the dynamo-electric-machine as a motor to start the engine, when the fuel supply reaches a predetermined low point, or for immediately discontinuing the operation of the dynamo in case the fuel supply reaches a predetermined low point.

7. In a device of the character described, the combination with an engine having a fuel supply; of a dynamo-electric-machine connected thereto and adapted to operate as a motor for starting purposes; a storage battery electrically connected to said machine; and means controlled by the level of the fuel supply for rendering the electrical connections entirely ineffective to permit the machine to operate as a motor, when the level of the fuel supply reaches a predetermined low point, or for immediately discontinuing the operation of the dynamo in case the fuel supply reaches a predetermined low point.

8. In a device of the character described, the combination with an engine having a fuel supply; of a starting device therefor; means for entirely preventing the operation of the starting device when the fuel supply reaches a predetermined low point; and a signaling device operable by said means to indicate the low level of the fuel supply, or for immediately discontinuing the operation of the starting device in case the fuel supply reaches a predetermined low point.

9. In a device of the character described, the combination with an engine having a fuel supply; of a dynamo-electric-machine connected thereto and adapted to operate as a motor for starting purposes; a storage battery electrically connected to said machine; means controlled by the level of the fuel supply for rendering the electrical connections entirely ineffective to permit the machine to operate as a motor, when the level of the fuel supply reaches a predetermined low point; and a signaling device adapted to be brought into operation when the means controlled by the level of the fuel reaches said predetermined low point, or for immediately discontinuing the operation of the dynamo in case the fuel supply reaches a predetermined low point.

10. In a device of the character described, the combination with an engine having a fuel supply; of a dynamo-electric-machine connected thereto; an electric storage battery electrically connected to the dynamo-electric-machine; a measuring instrument included in the electrical connections between the storage battery and dynamo-electric-machine and adapted to open said connections when a predetermined amount of current has been charged into the battery, and adapted to close said electric connections when a predetermined amount of current has been discharged from said battery; and means controlled by the fuel supply for entirely preventing the operation of the electric machine as a motor when said electric connections are closed by said instrument when the fuel supply reaches a predetermined low point, or for immediately discontinuing the operation of the dynamo in case the fuel supply reaches a predetermined low point.

11. In a device of the character described, the combination with an engine having a fuel supply; of a dynamo-electric-machine connected to said engine and adapted to operate as a motor for starting purposes; and as a generator for charging purposes; a storage battery electrically connected to said machine; an ignition circuit between the battery and the engine; means controlled by the state of charge of the storage battery for automatically breaking the ignition circuit when the battery becomes fully charged, and for making the circuit connections between the battery and the electric machine, when the battery charge reaches a predetermined low point; and means controlled by the fuel supply for breaking the circuit connections between the battery and the electric machine, when the fuel reaches a predetermined low point, whereby the operation of the electric machine as a motor for starting purposes will be entirely prevented regardless of the condition of charge of the battery, or for immediately discontinuing the operation of the dynamo in case the fuel supply reaches a predetermined low point.

In testimony whereof I affix my signature in the presence of two subscribing witnesses.

CHARLES F. KETTERING.

Witnesses:
WALTER W. RIEDEL,
J. W. MCDONALD.

Certificate of Correction.

It is hereby certified that the assignee in Letters Patent No. 1,337,364, granted April 20, 1920, upon the application of Charles F. Kettering, of Dayton, Ohio, for an improvement in "Systems of Electrical Generation and Control," was erroneously described and specified as "The Delco-Light Company, of Dayton, Ohio, a Corporation of Ohio," whereas said assignee should have been described and specified as *Delco-Light Company, of Dayton, Ohio, a Corporation of Delaware*, as shown by the records of assignments in this office; page 2, line 110, for the reference numeral "52" read *43;* and that the said Letters Patent should be read with these corrections therein that the same may conform to the record of the case in the Patent Office.

Signed and sealed this 9th day of May, A. D., 1922.

[SEAL.]

KARL FENNING,
*Acting Commissioner of Patents.*